(12) United States Patent
Trottier et al.

(10) Patent No.: US 6,423,134 B1
(45) Date of Patent: Jul. 23, 2002

(54) FIBER REINFORCED BUILDING MATERIALS

(76) Inventors: Jean-François Trottier, 158 Shore Dr., Bedford, Nova Scotia, B4A 2E5; Michael Mahoney, 998 College Rd., Truro, Nova Scotia, B2N 5B2, both of (CA)

(*) Notice: Subject to any disclaimer, the term of this patent is extended or adjusted under 35 U.S.C. 154(b) by 0 days.

(21) Appl. No.: 09/646,026
(22) PCT Filed: Mar. 11, 1999
(86) PCT No.: PCT/CA99/00209
§ 371 (c)(1),
(2), (4) Date: Dec. 13, 2000
(87) PCT Pub. No.: WO99/46214
PCT Pub. Date: Sep. 16, 1999

Related U.S. Application Data (63) Continuation-in-part of application No. 09/038,860, filed on Mar. 11, 1998, now Pat. No. 5,993,537.

(51) Int. Cl.[7] .................................................. C04B 16/06
(52) U.S. Cl. ......................... 106/802; 106/644; 106/724
(58) Field of Search .................................. 106/644, 724, 106/802

(56) References Cited

U.S. PATENT DOCUMENTS

| | | | |
|---|---|---|---|
| 1,633,219 A | 6/1927 | Martin | 264/108 |
| 1,913,707 A | 6/1933 | Etheridge | 428/221 |
| 3,986,885 A | 10/1976 | Lankard | 106/644 |
| 4,066,723 A | 1/1978 | King et al. | 264/34 |

(List continued on next page.)

FOREIGN PATENT DOCUMENTS

| | | |
|---|---|---|
| AT | 394547 | 10/1991 |
| CA | 1273649 | 4/1990 |
| CA | 2024695 | 9/1990 |
| CA | 2029206 | 11/1990 |
| CA | 2132439 | 1/1993 |
| DE | 388959 | 1/1924 |
| EP | 0 079 554 | 5/1983 |
| EP | 0 347 092 | 12/1989 |
| EP | 0 353 062 | 1/1990 |
| FR | 914186 | 9/1945 |
| JP | 60/141657 | 7/1985 |
| JP | 04 40755 | 2/1994 |

OTHER PUBLICATIONS

Horigume, Tsugo, "Fiber–reinforced Cement Articles," *Chemical Abstracts* 112(4):340 (1990).

Ramakrishnan, V., et al., "A Comparative Evaluation of Concrete Reinforced with Straight Steel Fibers and Fibers with Deformed Ends Glued Together into Bundles," *ACI Journal* 77(3):135–143 (1980).

(List continued on next page.)

*Primary Examiner*—Paul Marcantoni
(74) *Attorney, Agent, or Firm*—Stephen E. Reiter; Foley & Lardner (57) ABSTRACT

In accordance with the present invention, there are provided novel fiber reinforced building material formulations, comprised of an inorganic binding agent and synthetic fibers. The fibrous material employed in invention formulations is capable of undergoing progressive fibrillation upon agitation. As a result, tougher building materials, due to higher fiber addition rates than previously possible, are produced. Formulations containing Portland cement-based compositions and fibrillating synthetic fibers are also contemplated. In addition, there are provided methods of producing fiber reinforced building materials, including Portland cement-based compositions, and articles produced therefrom.

57 Claims, 1 Drawing Sheet

U.S. PATENT DOCUMENTS

| | | | |
|---|---|---|---|
| 4,261,754 A | 4/1981 | Krenchel et al. | 106/90 |
| 4,314,003 A | 2/1982 | Curnow et al. | 428/294 |
| 4,407,676 A | 10/1983 | Restrepo | 106/88 |
| 4,414,030 A | 11/1983 | Restrepo | 106/90 |
| 4,474,907 A | 10/1984 | Genba et al. | 523/206 |
| 4,524,101 A | 6/1985 | Eickman et al. | 428/294 |
| 4,565,840 A | 1/1986 | Kobayashi et al. | 524/8 |
| 4,627,998 A | 12/1986 | Akihama et al. | 428/285 |
| 4,910,076 A | 3/1990 | Ando et al. | 428/245 |
| 4,968,561 A | 11/1990 | Mizobe et al. | 428/397 |
| 5,224,774 A | 7/1993 | Valle et al. | 366/2 |
| 5,275,884 A | 1/1994 | Nishino et al. | 428/374 |
| 5,298,071 A * | 3/1994 | Vondran | 106/757 |
| 5,338,357 A | 8/1994 | Takai et al. | 106/724 |
| 5,399,195 A | 3/1995 | Hansen et al. | 106/711 |
| 5,451,471 A | 9/1995 | Over et al. | 428/574 |
| 5,456,752 A | 10/1995 | Hogan | 106/802 |
| 5,628,822 A | 5/1997 | Hogan | 106/802 |
| 5,788,760 A | 8/1998 | Li et al. | 106/644 |
| 5,814,146 A * | 9/1998 | Maggio et al. | 106/802 |

OTHER PUBLICATIONS

Morgan, D.R. and Rich., L., "High Volume Synthetic Fiber Reinforced Shotcrete," The First International Conference on Synthetic Fiber Reinforced Concrete, Orlando, Florida, USA (Jan. 16, 1998).

Morgan, D.R., et al., "A Comparative Evaluation of Plain, Polypropylene Fibre, Steel Fibre and Wire Mesh Reinforced Shotcretes," Transportation Research Board Annual Meeting, Washington, DC (Jan. 1989).

Ramakrishnan, V., et al., "Durability Evaluations and Performance Histories of Projects Using Polyolefin Fiber Reinforced Concrete" ACI BC Chapter, High Performance Concrete Seminar, Vancouver, BC (Apr. 1997).

Synthetic Industries, product literature, Beyond Secondary Reinforcement. S152 High Performance Polymer: The Shaped Fibers for Shotcrete that Provide Optimum Toughness and Pullout Resistance (1998).

Chemical Abstract No. 128:309552, abstract of Japanese Patent Specification No. 10–095922 (1998).

European Patent Abstract No. EP000220649A1, abstract of European Patent Specification No. 220649 (1987).

European Patent Abstract No. EP000286112A2, abstract of European Patent Specification No. 286112 (1988).

* cited by examiner

FIGURE 1

FIBER REINFORCED BUILDING MATERIALS

This application is a continuation-in-part of Ser. No. 09/038,860 filed Mar. 11, 1998, now U.S. Pat. No. 5,993,537.

FIELD OF THE INVENTION

The present invention relates to fiber reinforced building materials. In a particular aspect, the invention relates to methods for the production of building materials reinforced with synthetic fiber that, under agitation, progressively fibrillates, to produce building materials with enhanced performance properties. In another aspect of the present invention, there are provided articles prepared from the above-described fiber reinforced materials.

BACKGROUND OF THE INVENTION

Concrete has the largest production of all man made materials. Compared with other construction materials, it possesses many advantages including low cost, general availability of raw materials, adaptability and utilization under different environmental conditions. Therefore, concrete will most probably continue to be the dominant construction material in the foreseeable future. Unfortunately, plain concrete is also a brittle material with very low tensile strength and strain capacity, generally requiring reinforcement before it can be used extensively as a construction material.

The idea of using another material to reinforce a low tensile strength material is an age-old concept. For example, straw and horsehair have been used for thousands of years to improve the properties of clay bricks. Bentur, A., Mindess, S., "Fiber Reinforced Cemetitious Composites," (Elsevier Applied Science, 1990), In more recent years, fibers have been incorporated into a wide range of engineering materials (including ceramics, plastics, cement, and gypsum products) to enhance the performance properties of the resulting composite. American Concrete Institute ACI 544.1R-96, "Fiber Reinforced Concrete," 1996. Introduction of fibers into concrete results in post-elastic property changes that range from subtle to substantial, depending upon a number of factors, including matrix strength, fiber type, fiber modulus, fiber aspect ratio, fiber strength, fiber surface bonding characteristics, fiber content, fiber orientation, aggregate size effects, and the like. The enhanced properties include tensile strength, compressive strength, elastic modulus, crack resistance, crack control, durability, fatigue life, resistance to impact and abrasion, shrinkage, expansion, thermal characteristics, and fire resistance. Id.

Although fiber reinforcement is known to be more effective than conventional reinforcement in the control of local cracking, unlike reinforcing bars, it does not, in most cases, provide any increase in the load bearing capacity of concrete. Conventional reinforcing bars are strategically located in the structure to carry tensile stresses while fibers are distributed randomly in the concrete mixture. Fibers, therefore, are not used in design as a substitute for conventional reinforcement. Although not currently addressed by ACI Committee 318, fibers are sometimes used in structural applications with conventional reinforcement. American Concrete Institute, ACI 318 Building Code Requirements for Reinforced Concrete, 1995.

The practice of adding steel fibers to concrete to overcome its drawbacks was first introduced early in this century. Between 1920 and 1935 several patents pertaining to steel fiber reinforced concrete (SFRC) were granted. See, e.g., Kleinlagel, A., German Patent No. 388.959; Scailles, J. C., French Patent No. 514.186; Martin, G. C., U.S. Pat. No. 1,633,219; and Etherridge, H., U.S. Pat. No. 1,913,707. Use of glass fibers in concrete was first attempted in the USSR in the late 1950s. Biryukovich, K. L., and Yu, D. L., "Glass Fiber Reinforced Cement," (translated by G. L. Cairns, CERA Translation, No.12, Civil Eng. Res. Assoc., London, 1965). Initial attempts at using synthetic fibers (nylon, polypropylene) were made in the 1960s. Monfore, G. E., "A review of Fiber Reinforced Portland Cement Paste, Mortar and Concrete," *J. Res. Dev. Labs,* Vol. 10, No. 3, September 1968, pp. 36–42; Goldfein, S., "Plastic Fibrous Reinforcement for Portland Cement," Technical Report No. 1757-TR, U.S. Army Research Development Laboratories, Fort Belvoir, October 1963, pp. 1–16.

When steel fibers first were used, only straight steel fibers were employed. The use of steel fibers resulted in improved characteristics for ductility and fracture toughness; flexural strength increases were also reported. For straight steel fibers, the primary factors that controlled the properties of the composite were fiber volume fraction and length/diameter, or aspect ratio of the fibers. The amount of fibers ranged from 90 to 120 kg/m$^3$ (1.1 to 1.5% by volume) of concrete. The aspect ratios were in the range of 60 to 100. The major problems encountered in the early stages were difficulty in mixing and workability. At higher volume fractions, fibers were found to ball up during the mixing process. This process, called balling, was found to occur frequently for longer fibers. This tends to affect the quality of concrete in place, especially for higher fiber volume fractions. Furthermore, there was always a reduction in workability of the concrete as a result of the addition of fibers.

The advent of deformed steel fibers in the late 1970's resulted in increased use of fiber reinforced concrete in the field. Ramakrishnan established that fibers with hooked ends can be used at much lower volume fractions than straight steel fibers, producing the same results in terms of product ductility and toughness. Ramakrishnan, V., Brandshaug, T., Coyle, W. V., and Schrader, E. K., "A Comparative Evaluation of Concrete Reinforced with Straight Steel Fibers and Deformed End Fibers Glued Together in Bundles," ACI Journal, Vol. 77, No.3, May-June 1980, pp. 135–143. These fibers were glued together at the edges with water soluble glue such that, when added to the concrete, the fibers had a much lower (apparent) aspect ratio. During mixing, the fibers were separated and dispersed as individual fibers. The gluing and subsequent dispersal, in combination with a lower volume fraction of fibers, resulted in virtual elimination of balling. Later, a number of other fiber shapes such as crimped, paddled, and enlarged ends were also developed.

The ACI 544 Committee Report on Fiber Reinforced Concrete, published in 1996, reports that the first significant use of synthetic fibers in concrete was done in 1965, by the US Army Corps of Engineers Research and Development Section. American Concrete Institute ACI 544.1R-96, "Fiber Reinforced Concrete," 1996. Synthetic monofilament fibers were used for construction of blast-resistant concrete structures. The fibers used were 13 to 25 mm long and had an aspect ratio of between 50 to 100, i.e. geometry not too different from the steel fibers being used in concrete at that time. With these fibers it was found that addition rates of up to 0.5% by volume of the concrete resulted in significant increases in ductility and impact resistance.

There was, however, very little commercial exploitation of fiber reinforcement technology and it was not until the 1980's that large scale development and use of synthetic fibers in concrete started to take place. This work was predominantly done with much lower denier fibers (i.e. small diameter fibers with high aspect ratios) at lower fiber addition rates. Morgan, D. R., and Rich, L., "High Volume Synthetic Fiber Reinforced Shotcrete," The First International Conference on Synthetic Fiber Reinforced Concrete, Orlando, Fla., USA, Jan. 16, 1998. Most work was performed with collated, fibrillated polypropylene fibers at 0.1 to 0.2% by volume addition rates. At these lower fiber volume addition rates, the primary benefits of the fibers are for plastic shrinkage crack control and provision of green strength to extruded and certain green-cast, precast concrete products. Enhancement of ductility and impact resistance, and resistance to long term restrained drying shrinkage cracking is limited at such low fiber volume addition rates. It should be noted that even at these low fiber addition rates, the fiber count (number of fibers in a unit volume of matrix) and specific surface (surface area of fibers per unit volume of matrix) is very high. Consequently, it is currently very difficult to introduce in concrete more than 0.4% by volume of conventional fibrillating polypropylene fibers without making significant changes to the concrete mixture design. As a result, the majority of synthetic fibers used today are incorporated in concrete at very low fiber addition rates to simply control plastic shrinkage.

With the emergence of new areas of application, research interest has moved to higher fiber contents where toughness index and other factors are design considerations. Toughness index is an indication of the load-carrying capabilities of the fibers within the concrete matrix after first crack. As previously mentioned, cast-in-place concrete will accommodate up to 0.4% by volume of synthetic fibers with minimal mix proportion adjustments. Wet mix shotcrete with fibers added at a rate of up to 0.75% by volume will provide major increases in toughness index values. Morgan, D. R., McAskill, N., Richardson, B. W., and Zellers, R. C., "A Comparative Evaluation of Plain, Polypropylene Fibers, Steel Fibers, and Wire Mesh Reinforced Shotcrete," Transportation Research Board, Washington D.C., January 1989. Fiber length and fiber configuration are important factors at this fiber content. In slab-on-grade applications, the use of collated fibrillated polypropylene fiber at contents up to 0.3% by volume has dramatically increased the fatigue strength. American Concrete Institute ACI 544.1R-96, "Fiber Reinforced Concrete," 1996.

A few years ago, a new monofilament, polyolefin fiber, with a unique dispensing system, was developed, which has now been used at fiber addition rates in the 1.0 to 2.0% by volume range (i.e. values up to 10 times greater than the conventional use of fibrillated polypropylene fibers). The fiber has been used in a range of different concrete flatwork and other cast-in-place concrete applications, e.g. full-depth concrete pavement, bridge deck overlays, whitetopping, etc. Ramakrishnan, V., and MacDonald, C. N., "Durability Evaluation and Performance Histories of Projects Using Polyolefin Fiber Reinforced Concrete," ACI British Columbia Chapter, High Performance Concrete Seminar, Vancouver BC, April 1997, p. 15. The fibers used range in length from 25 to 50 mm and have aspect ratios in the range of 66 to 80. At these much higher fiber addition rates, ductility, impact resistance and toughness in the concrete composites are substantially increased and are much more comparable to values achieved with steel fiber reinforced concretes, with 0.5 to 0.7% (40 to 55 kg/m$^3$) fiber addition by volume. Apart from demonstrating excellent reinforcing characteristics the polyolefin fiber has the advantage over its steel counterpart in that it would never rust. Following the same philosophy (use of polymeric fiber at high addition rates), Synthetic Industries has just released a new polymer fiber for shotcrete applications. The new fiber, called S-152 High Performance Polymer (HPP), is manufactured as a coarse filament with an engineered contoured profile. Synthetic Industries, product literature, 1998. The wave-like shape of the fibers is designed to anchor the fibers in the shotcrete. Additionally, the coarseness of the fiber allows it to be blended at much higher rate per unit volume than conventional fibers, thereby giving the shotcreted application enhanced structural performance.

Polyolefin fiber is, however, of limited utility because it is a monofilament fiber that will remain in its original form after mixing. It has a relatively low surface area and hence has correspondingly poor bonding characteristics. Therefor, one must introduce a relatively large percent by volume (1.5% and higher) in order to achieve beneficial results.

Addition of fibers to concrete will generally result in loss of slump and handling characteristics of the mixture. This loss is magnified as the aspect ratio (length/diameter) of the fiber or the addition rate of fibers increases. For conventionally mixed fiber reinforced concrete, high aspect ratio fibers are more effective in improving the post-peak performance because of their high resistance to pullout from the matrix. A detrimental effect of using high aspect ratio fibers is the potential for balling of the fibers during mixing.

Most synthetic fibers used today are fibrillated fibers having very high surface areas and aspect ratios. The very high surface areas of these fibers make it very difficult to produce a workable concrete mixture at higher fiber addition rates than 0.5% by volume, without causing severe workability and fiber balling problems. For this reason, synthetic fibers are mostly used at 0.1% by volume fiber addition rates, and are added mostly for the control of shrinkage cracking in concrete.

Thus, there is still a need in the art for fiber reinforced concrete formulations that overcome the disadvantages noted above, while still maintaining superior shrinkage and handling characteristics. More particularly it would be desirable to be able to employ fiber of a type that is less sensitive to balling and can therefor be added at higher volume fractions. Higher volume fractions will result in increased reinforcing characteristics, previously unattainable with fiber-reinforced building materials such as concrete.

BRIEF DESCRIPTION OF THE INVENTION

The present invention addresses the above-described needs in the art by providing fiber reinforced building materials, such as concrete, having improved performance properties such as reduced plastic shrinkage, reduced drying shrinkage, improved fire resistance, improved fatigue life, improved resistance to thermal expansion and contraction, higher toughness index, improved workability and handling, and the like. Invention reinforced building materials are prepared using fibrous material having defined initial properties and the specific ability to fibrillate resulting in substantially increased surface area upon mixing.

The initial low surface area of fibrous material contemplated for use according to the invention allows the addition of a relatively high fiber content without making any changes to the concrete mixture design or using any time release bonding agent to avoid balling of the fibers. The ability of fibrous material employed herein to undergo progressive fibrillation enables one to achieve a uniform distribution of fibers throughout the concrete mix in the early stages of mixing, while the fibers are still relatively intact. Subsequently, when the fibers start to fibrillate, they do not, at that stage, tend to ball since they have already been well dispersed in the concrete mix.

DETAILED DESCRIPTION OF THE INVENTION

In accordance with the present invention, there are provided building product formulations comprising a mixture containing inorganic binding agent and in the range of about 0.1 up to about 3.0 percent by volume of a fibrous material, wherein said fibrous material is characterized by having:

(a) a low initial aspect ratio, (b) an initial surface area of no greater than about 200 mm$^2$;

wherein said fibrous material is capable of, and undergoes, progressive fibrillation under agitation of said formulation, resulting in an average increase in surface area of at least about 20 percent, preferably at least about 50 percent. Also provided herein are methods of producing the above-described building product formulation as well as articles comprising the formulation.

As employed herein, "building product formulation" refers to a variety of construction materials and matrices including, Portland cement-based formulations and articles produced therefrom, such as concrete, shotcrete, bricks, mortar, plaster, white-top, synthetic composites, carbon-based composites, and the like. In a preferred embodiment of the invention, the Portland cement-based formulation is concrete comprised of Portland cement, stone (such as gravel or crushed rock) and sand.

Those of skill in the art can readily identify inorganic binding materials suitable for use in the practice of the present invention. As used herein, the term "inorganic binding materials" refers to predominantly non-carbon containing materials that serve to hold together the various solid constituents of an aggregate. Examples of materials contemplated for use herein include portland cement, clay, stucco, plaster of paris, and the like. Such materials, including those currently available and those developed in the future, are contemplated for use in compositions and methods of the present invention.

As used herein, "fibrous material" refers to a synthetic monofilament tending to break up by progressive splitting of the fibers, typically from the ends of the fibers inwards (i.e., "fibrillate"), under appropriate conditions, into a plurality of various length filaments, from full length to microscopically small, each of much smaller cross-sectional area and higher aspect ratio than the original monofilament. It is, of course, recognized by those of skill in the art that the fibrous material may not completely split or break apart, but may remain one unit composed of a plurality of fibrils (i.e., may be partially fibrillated). In one aspect of the present invention, a population of long, short, attached and detached fibrils may be expected under the appropriate conditions. Conditions suitable for generating the fully and partially fibrillated fibers include agitation, mixing, vibrating, spraying, and the like. The resulting variety in fiber size and aspect ratios of fibrillated fibers will contribute to a range of enhanced characteristics such as workability, toughness and resistance to shrinkage.

The fibrous material contemplated for use herein typically has such desirable performance properties as resilience, tensile strength, toughness, resistance to changes in pH, and resistance to moisture, sufficient to render such materials useful for reinforcing building product formulations under standard loads and conditions. In a specific embodiment, fibrous material contemplated for use herein is comprised of flat, crimped and/or embossed fiber articles. In another aspect of the present invention the initial cross sectional dimensions of the original synthetic monofilament are about 1.1 mm×0.37 mm. In accordance with another specific aspect of the invention, fibrillated or partially-fibrillated fibrous material comprises a fine network structure of fibers of a synthetic polymer blend. As used herein, the phrase "network structure" conforms to the normal usage of the term, i.e., the fibrillated and partially-fibrillated fibers form a relatively disordered mesh or tangled net-like structure. The modifier "fine", as used in the phrase "fine network structure", denotes the inherently small nature of the network due to the size of the fibers described herein for use in invention compositions and methods.

Examples of suitable synthetic polymer blends contemplated for use herein include polymer blends of polypropylene and polyethylene. Preferably, the polyethylene/polypropylene blend employed herein will have a mass of about 7.5 grams per denier, a specific gravity of about 0.94 and a stretch elongation at break in the range of about 16% up to about 18%. In this preferred embodiment, the polymer blend is comprised of in the range of about 70 up to about 90% polypropylene resin having a melt flow rate in the range of about 1.2 up to about 4 g/10 min. and a specific gravity in the range of about 0.88 up to about 0.90 g/cm$^3$. The other component of the presently preferred polymer-blend is in the range of about 10 up to about 30% high density polyethylene resin with a melt flow rate of in the range of about 0.6 up to about 1.1 g/10 min and a specific gravity of in the range of about 0.94 up to about 0.96 g/cm$^3$. In a preferred aspect of the invention, the fibrous network consists of the above-described polyethylene/polypropylene polymer blend exclusively and is not held together by any type of adhesive agent. Exemplary fibers of this type are made under the name of "Polysteel™" and are available in rope form from East Coast Rope Ltd., of Sydney, Nova Scotia, Canada.

Fibers contemplated for use in accordance with invention compositions and methods may be produced by any method known in the art. In one aspect of the present invention, fibers contemplated for use in the practice of the invention are manufactured by individually extruding a filament which is subsequently quenched and then stretched in a stretching oven. The filament is then reheated in an annealing oven to relax the filament and lock in the "memory" of the filament. The filament may then be embossed to create flexibility and enhance grip ability of the filament. Finally, the filament is cut to the specified length (application dependent) using, for example, a rotatory cutting wheel. Of course, as readily recognized by those of skill in the art, other suitable methods for producing fibers meeting the fiber specifications set forth herein may also be employed.

As employed herein, "aspect ratio" means the length of a fiber divided by the diameter of a cylindrical fiber having a similar cross-sectional area. In accordance with the present invention the fibrous material employed has a low initial aspect ratio. Suitable aspect ratios can be readily determined by those of skill in the art. Typically, the initial aspect ratio will fall in the range of about 30 up to about 80. As will be readily understood by those of skill in the art, any value in the above-described range may be employed in the practice of the present invention, depending on the particular formulation of invention compositions, the intended use, the desired property(ies) of invention compositions, and the like. For example, in one aspect of the invention, when preparing formulations useful for pumped concrete (e.g. "shotcrete"), the initial aspect ratio should be at the lower end of the range, typically about 50. In another aspect of the invention, when preparing formulations useful for poured or cast in place concrete (such as slabs) the initial aspect ratio should be at the higher end of the range, typically be about 70.

As readily recognized by those of skill in the art, a wide range of fiber lengths are suitable for use in the practice of the present invention. As will be understood by those of skill in the art, the length of fibers to be employed in the practice of the present invention will vary depending on the particular formulation of invention compositions, the intended use, the desired property(ies) of invention compositions, and the like. For example, in one aspect of the invention, when preparing formulations useful for pumped concrete, the initial fiber length for fibrous material contemplated for use herein will be relatively short, typically about 38 mm. In another aspect of the invention, when preparing formulations useful for poured or cast in place concrete, fiber length will be somewhat longer, typically about 50 mm.

As used herein, the "low initial surface area" contemplated for the fibrous material employed herein is no greater than about 200 mm$^2$. It is presently preferred that the initial surface area be no greater than about 150 mm$^2$. In a specific embodiment for use in the preparation of Portland cement-based compositions that are to be pumped (e.g. "shotcrete" and the like), an initial surface area of about 110 mm$^2$ is preferred. In a specific embodiment for use in the preparation of Portland cement-based compositions that are to be cast or poured in-place, the preferred initial surface area is about 150 mm$^2$.

As employed herein, "agitation" refers to any means of blending/mixing the contents of the invention formulations. All such means are contemplated for use in the practice of the present invention. Agitation may be accomplished by any mechanical means, such as, for example, by mixing, rotating, stirring, shaking, pouring, kneading, vibrating, pumping, and the like. Additional means of agitation contemplated for use in the present invention include ultrasonic vibration and thermally induced mixing or turbulence. In a presently preferred embodiment, the agitation will occur through the mechanical action of a cement mixer.

Use of the term "fibrillation" in the present claims and specification, refers to the progressive separation or splitting of the initial low-surface-area fibrous material into individual members of the component fibrous network. In a given population of fibrous material that has undergone fibrillation, some of the initial low-surface-area fibrous material may remain substantially intact and unseparated, while others of the starting fibers may substantially completely separate. According to the present invention, following fibrillation, a range of separated fibers will exist, resulting in an average increase in surface area of the population of fibrous material of in the range of at least about 20 percent, preferably at least about 50 percent. In a particularly preferred embodiment, the fibrous material will have undergone an average increase in surface area of at least 100 percent. In an especially preferred embodiment, the population of fibers will represent an average increase in surface area of the fibrous material of at least 200 percent. In a preferred embodiment of the present invention, the progressive fibrillation of the fibers allows one to achieve a near uniform distribution of the fibers throughout the concrete mix in the early stages of the mixing while the fibers are still relatively intact (i.e., prior to the fibrillation thereof).

As will readily be understood by those of skill in the art, even the slightest increase in surface area of the fiber (e.g., 5% and up), caused by a minimal level of fibrillation, will lead to improvements in the overall performance properties (e.g., flexural toughness, plastic shrinkage, drying shrinkage, fire resistance, fatigue life, resistance to thermal expansion and contraction, impact resistance, workability, pumping and handling, and the like) of the fiber reinforced building materials over that achieved with the original (i.e., non-fibrillated) monofilament fiber. More substantial increases (e.g., in the range of at least about 50 percent) in surface area of the fiber will lead to significant improvements in performance properties. Fibrillation of fibers contemplated for use in accordance with the present invention will lead to average increases in the surface area of the fibrous material anywhere up to about 20,000% or higher. In spite of these average values, those of skill in the art will readily recognize that even at high percentage increases in the surface area, some fibers will remain intact and show no visible increase in surface area after mixing and placing.

In accordance with one aspect of the present invention, there are provided building product formulations comprising the herein-described fibrous material in the range of about 0.1 up to about 3.0 percent by volume. Such building product formulations show improved characteristics, when compared to other fiber reinforced building formulations, such as reduced plastic shrinkage, reduced drying shrinkage, improved fire resistance, improved fatigue life, improved resistance to thermal expansion and contraction, improved impact resistance, increased flexural toughness, improved workability, pumping and handling, and the like.

In accordance with another aspect of the present invention, there are provided building product formulations comprising in the range of about 0.1 up to about 0.3 percent by volume of the herein-described fibrous material. At these lower rates of fiber addition, such formulations demonstrate improved characteristics such as plastic shrinkage, drying shrinkage, improved fire resistance, improved fatigue life, improved resistance to thermal expansion and contraction, improved workability, pumping and handling, as well as some improvement in impact resistance and flexural toughness.

In yet another aspect of the present invention, there are provided building product formulations comprising in the range of about 0.3 up to about 3.0 percent by volume of the herein-descried fibrous material. At these relatively higher rates of fiber addition such formulations also demonstrate improved characteristics such as plastic shrinkage, drying shrinkage, improved fire resistance, improved fatigue life, improved resistance to thermal expansion and contraction, improved workability, pumping and handling, as well as substantial improvements in impact resistance and flexural toughness.

In accordance with another embodiment of the present invention, there are provided methods of producing building product formulations by adding the above-described fibrous material to inorganic binding materials wherein the formulation is subjected to agitation sufficient to achieve an average increase in surface area of the fibers of at least about 20 percent, preferably at least about 50 percent. These methods yield building materials having, when compared with other synthetic fiber reinforcement systems, improved characteristics such as reduced plastic shrinkage, reduced drying shrinkage, improved fire resistance, improved fatigue life, improved resistance to thermal expansion and contraction, improved impact resistance, increased flexural toughness, improved workability, pumping and handling, and the like.

In one aspect of invention methods, in the range of about 0.1 up to about 0.3 percent by volume of fibrous material is added to a Portland cement-based composition which is then subjected to agitation as above, thereby providing building product formulations with improved characteristics such as plastic shrinkage, drying shrinkage, improved fire resistance, improved fatigue life, improved resistance to thermal expansion and contraction, improved workability, improved pumping and handling, as well as some improvement in impact resistance and flexural toughness.

In another aspect of invention methods, in the range of about 0.3 up to about 3.0 percent by volume of a fibrous material is added to a Portland cement-based composition which is then subjected to agitation as above, thereby providing building product formulations with plastic shrinkage, drying shrinkage, improved fire resistance, improved fatigue life, improved resistance to thermal expansion and contraction, improved workability, pumping and handling, as well as substantial improvements in impact resistance and flexural toughness.

In accordance with another embodiment of the present invention, there are provided articles comprising the building product formulations described above. In a preferred aspect of the invention there are provided articles comprising the Portland cement-based formulations described above.

The invention will now be described in greater detail by reference to the following, non-limiting examples.

EXAMPLES

In a recent experiment, it was demonstrated that 3000 denier Polysteel™ fiber (available from East Coast Rope, Ltd., North Sydney, Nova Scotia), comprised of polyethylene/polypropylene polymer blend with a mass of about 7.5 grams per denier, a specific gravity of about 0.94 and a stretch elongation at break in the range of about 16% up to about 18%, when added at a volume addition rate of 1% outperformed polyolefin fiber at 1.67% by volume (fiber of similar initial specific surface area, and identical tensile strength and modulus of elasticity) in both flexural toughness and plastic shrinkage performance. Similar tests were conducted on a series of steel fibers at fiber addition rates of 0.5 and 0.75%; results show that the fibrillating fiber, when added at a volume addition rate of 1%, easily outperformed the steel fibers in the control of plastic shrinkage and drying shrinkage.

Figure 1:
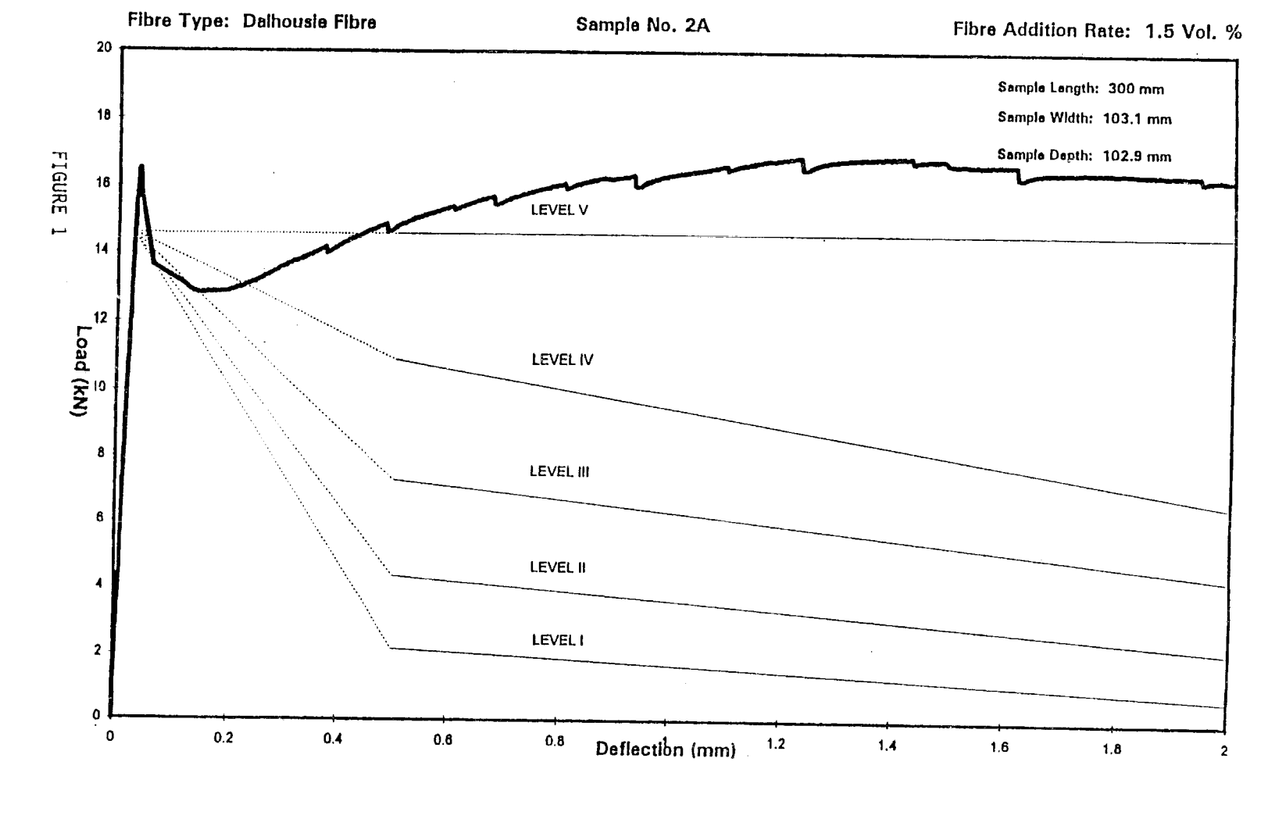
FIG. 1 graphically illustrates the flexural toughness curve of a "shotcrete" formulation containing 1.5% by volume of monofilament fibers having performance/physical properties as described for use in the practice of the present invention.

Shotcrete tests conducted on fiber, having performance and physical properties described herein, reveals that the fiber is easily pumped and shot at fiber volume fractions up to 1.5%. A slight change in the concrete mixture design allowed the fiber to be pumped and shot at a very high percent addition rate of 2% by volume. One should note that it is almost impossible to pump and shoot most fibrillated synthetic fibers available on the market at fiber addition rates in excess of 0.5% by volume. Again, the initial low fiber surface area of the monofilament fiber allowed the addition of a very high amount of fibers in the shotcrete. In the case of shotcrete, the fibrillating action was produced both by the mixing action of the concrete mixer and by the impact of the fibers onto the projected surface. The results, as illustrated in FIG. 1, indicate that the fibrillating fiber has achieved a Toughness Performance Level V at 1.5% addition, a performance never reached by any synthetic fiber before. Fiber addition rates of 1% in shotcrete of the fibrillating fiber achieved Toughness Performance Level IV, which is again, substantially higher that other synthetic fiber.

While the invention has been described in detail with reference to certain preferred embodiments thereof, it will be understood that modifications and variations are within the scope and spirit of that which is described and claimed.

That which is claimed:

1. A building product formulation comprising a mixture containing inorganic binding agent and in the range of about 0.1 up to about 3.0 percent by volume of a fibrous material,
   wherein said fibrous material is composed of synthetic resin monofilaments and wherein said fibrous material is characterized by having:
      an initial surface area of each monofilament of the fibrous material of no greater than about 200 mm$^2$;
   wherein said fibrous material undergoes progressive fibrillation under agitation of said formulation, resulting in an increase in surface area of the fibrous material.

2. A Portland cement-containing formulation comprising Portland cement and in the range of about 0.1 up to about 3.0 percent by volume of a fibrous material,
   wherein said fibrous material is composed of synthetic resin monofilaments and wherein said fibrous material is characterized by having:
      an initial surface area of each monofilament of the fibrous material of no greater than about 200 mm$^2$;
   wherein said fibrous material undergoes progressive fibrillation under agitation of said formulation, resulting in an increase in surface area of the fibrous material.

3. A method for the production of a Portland cement-containing formulation, said method comprising adding in the range of about 0.1 up to about 3.0 percent by volume of a fibrous material to a Portland cement-containing composition,
   wherein said fibrous material is composed of synthetic resin monofilaments and wherein said fibrous material is characterized by having:
      an initial surface area of each monofilament of the fibrous material of no greater than about 200 mm$^2$;
   wherein said fibrous material undergoes progressive fibrillation under agitation of said formulation, resulting in an increase in surface area of the fibrous material.

4. A method of producing a building product formulation, said method comprising
   (a) adding in the range of about 0.1 up to about 3.0 volume percent of a fibrous material to an inorganic binding agent,
      wherein said fibrous material is composed of synthetic resin monofilaments and wherein said fibrous material is characterized by having:
         an initial surface area of each monofilament of the fibrous material of no greater than about 200 mm$^2$;
   (b) agitating the resulting combination to cause progressive fibrillation resulting in an increase in surface area of the fibrous material.

5. An article comprising a reinforced Portland cement-containing formulation, said formulation containing in the range of about 0.1 up to about 3.0 volume percent of a fibrous material,
   wherein said fibrous material is composed of synthetic resin monofilaments and wherein said fibrous material is characterized by having:
      an initial surface area of each monofilament of the fibrous material of no greater than about 200 mm$^2$;

wherein said fibrous material has undergone progressive fibrillation under agitation of said formulation, resulting in an increase in surface area of the fibrous material.

6. An article according to claim 5, wherein the increase in the surface area of the fibrous material is, on average, at least about 20 percent.

7. An article according to claim 5, wherein each monofilament of the fibrous material has an aspect ratio in the range of about 30 up to about 80 before agitation.

8. An article according to claim 5, wherein the fibrous material comprises at least one of flat fibers, crimped fibers and embossed fibers.

9. A fibrous material for use in a building product formulation, comprising synthetic resin monofilaments each having an initial surface area of no greater than about 200 mm$^2$, wherein the fibrous material undergoes progressive fibrillation under agitation resulting in an increase in surface area.

10. The fibrous material according to claim 9, wherein the increase in the surface area of the fibrous material is, on average, at least about 20 percent.

11. The fibrous material according to claim 9, wherein each monofilament of the fibrous material has an aspect ratio in the range of about 30 up to about 80 before agitation.

12. The fibrous material according to claim 9, wherein the fibrous material comprises at least one of flat fibers, crimped fibers and embossed fibers.

13. A formulation according to claim 1, wherein the increase in the surface area is, on average, at least about 20 percent.

14. A formulation according to claim 1, wherein each monofilament of the fibrous material has an aspect ratio in the range of about 30 up to about 80 before agitation.

15. A formulation according to claim 1, wherein said fibrous material comprises at least one of flat fibers, crimped fibers and embossed fibers.

16. A formulation according to claim 1, wherein said fibrous material is comprised of a fine network structure of filaments.

17. A formulation according to claim 1, wherein said synthetic resin monofilaments comprise a blend of polypropylene and polyethylene.

18. A formulation according to claim 1, wherein said fibrous material has a mass of about 7.5 grams per denier, a specific gravity of about 0.94 and a stretch elongation of about 16% to about 18%.

19. A formulation according to claim 1, comprising in the range of about 0.1 up to about 0.3 volume percent of said fibrous material.

20. A formulation according to claim 1, comprising in the range of about 0.3 up to 3.0 volume percent of said fibrous material.

21. A formulation according to claim 2, wherein the increase in the surface area of the fibrous material is, on average, at least about 20 percent.

22. A formulation according to claim 2, wherein monofilament of the fibrous material has an aspect ratio in the range of about 30 up to about 80 before agitation.

23. A formulation according to claim 2, wherein said fibrous material comprises at least one of flat fibers, crimped fibers and embossed fibers.

24. A formulation according to claim 2, wherein said fibrous material is comprised of a fine network structure of filaments.

25. A formulation according to claim 2, wherein said synthetic resin monofilaments comprise a blend of polypropylene and polyethylene.

26. A formulation according to claim 2, wherein said fibrous material has a mass of about 7.5 grams per denier, a specific gravity of about 0.94 and a stretch elongation of about 16% to about 18%.

27. A formulation according to claim 2, comprising in the range of about 0.1 up to about 0.3 volume percent of said fibrous material.

28. A formulation according to claim 2, comprising in the range of about 0.3 up to 3.0 volume percent of said fibrous material.

29. A method according to claim 3, wherein the increase in the surface area of the fibrous material is, on average, at least about 20 percent.

30. A method according to claim 3, comprising adding an amount of fibrous material effective in improving plastic shrinkage and/or drying shrinkage characteristics of the building production formulation.

31. A method according to claim 3, comprising adding an amount of fibrous material effective in improving flexural toughness characteristics of the building product formulation.

32. A method according to claim 3, comprising adding an amount of fibrous material effective in improving crack resistance and crack control of the building product formulation.

33. A method according to claim 3, comprising adding an amount of fibrous material effective in improving fatigue life of the building product formulation.

34. A method according to claim 3, comprising adding an amount of fibrous material effective in improving resistance to thermal expansion or thermal contraction of the building product formulation.

35. A method according to claim 3, comprising adding an amount of fibrous material effective in improving fire resistance of the building product formulation.

36. A method according to claim 3, comprising adding an amount of fibrous material effective in improving impact resistance of the building product formulation.

37. A method according to claim 3, comprising adding an amount of fibrous material effective in improving relative handling characteristics of the building product formulation.

38. A method according to claim 3, comprising adding an amount of fibrous material effective in improving relative pumping characteristics of the building product formulation.

39. A method according to claim 3, wherein each monofilament of the fibrous material has an aspect ratio in the range of about 30 up to about 80 before agitation.

40. A method according to claim 3, wherein said fibrous material comprises of at least one of flat fibers, crimped fibers and embossed fibers.

41. A method according to claim 4, wherein the increase in the surface area of fibrous material is, on average, at least about 20 percent.

42. A method according to claim 4, comprising adding an amount of fibrous material effective in improving plastic shrinkage and/or drying shrinkage characteristics of the building product formulation.

43. A method according to claim 4, comprising adding an amount of fibrous material effective in improving flexural toughness characteristics of the building product formulation.

44. A method according to claim 4, comprising adding an amount of fibrous material effective in improving crack resistance and crack control of the building product formulation.

45. A method according to claim 4, comprising adding an amount of fibrous material effective in improving fatigue life of the building product formulation.

46. A method according to claim 4, comprising adding an amount of fibrous material effective in improving resistance to thermal expansion or thermal contraction of the building product formulation.

47. A method according to claim 4, comprising adding an amount of fibrous material effective in improving fire resistance of the building product formulation.

48. A method according to claim 4, comprising adding an amount of fibrous material effective in improving impact resistance of the building product formulation.

49. A method according to claim 4, comprising adding an amount of fibrous material effective in improving relative handling characteristics of the building product formulation.

50. A method according to claim 4, comprising adding an amount of fibrous material effective in improving relative pumping characteristics of the building product formulation.

51. A method according to claim 4, wherein monofilament of the fibrous material has an aspect ratio in the range of about 30 up to about 80 before agitation.

52. A method according to claim 4, wherein said fibrous material comprises at least one of flat fibers, crimped fibers and embossed fibers.

53. The article according to claim 5, wherein said synthetic resin monofilaments comprise a blend of polypropylene and polyethylene.

54. The fibrous material according to claim 9, wherein said synthetic resin monofilaments comprise a blend of polypropylene and polyethylene.

55. The fibrous material according to claim 9, wherein said fibrous material is comprised of a fine network structure of filaments.

56. The fibrous material according to claim 9, wherein said snuthetic resin monofilaments comprise a blend of polypropylene and polyethylene.

57. The fibrous material according to claim 1, wherein said fibrous material has a mass of about 7.5 grams per denier, a specific gravity of about 0.94 and a stretch elongation of about 16% to about 18%.

* * * * *

UNITED STATES PATENT AND TRADEMARK OFFICE
CERTIFICATE OF CORRECTION

PATENT NO. : 6,423,134 B1
DATED : July 23, 2002
INVENTOR(S) : Jean-François Trottier It is certified that error appears in the above-identified patent and that said Letters Patent is hereby corrected as shown below:

Column 14,
Line 14, change "snuthetic" to -- synthetic --

Signed and Sealed this

Eighth Day of April, 2003

JAMES E. ROGAN
*Director of the United States Patent and Trademark Office*